United States Patent
Daup et al.

(10) Patent No.: US 11,092,504 B2
(45) Date of Patent: Aug. 17, 2021

(54) MICROMECHANICAL REDUNDANT PIEZORESISTIVE ARRAY PRESSURE SENSOR

(71) Applicant: Rosemount Aerospace Inc., Burnsville, MN (US)

(72) Inventors: Michael Robert Daup, Minneapolis, MN (US); David P. Potasek, Lakeville, MN (US)

(73) Assignee: ROSEMOUNT AEROSPACE INC., Burnsville, MN (US)

(*) Notice: Subject to any disclaimer, the term of this patent is extended or adjusted under 35 U.S.C. 154(b) by 206 days.

(21) Appl. No.: 16/418,719

(22) Filed: May 21, 2019

(65) Prior Publication Data

US 2020/0370981 A1 Nov. 26, 2020

(51) Int. Cl.
*G01L 9/00* (2006.01)
*G01L 9/06* (2006.01)
*H01C 1/16* (2006.01)

(52) U.S. Cl.
CPC .............. *G01L 9/0052* (2013.01); *H01C 1/16* (2013.01)

(58) Field of Classification Search
CPC ......... G01L 7/00; G01L 7/08; G01L 9/00–08; G01L 9/0052; H01C 1/16
See application file for complete search history.

(56) References Cited

U.S. PATENT DOCUMENTS

| | | | |
|---|---|---|---|
| 3,900,811 A * | 8/1975 | Kurtz | G01L 9/0042 338/2 |
| 4,766,655 A * | 8/1988 | Hickox | G01L 9/0054 29/25.35 |
| 5,184,515 A | 2/1993 | Terry et al. | |
| 6,289,738 B1 | 9/2001 | Zabler et al. | |
| 7,252,008 B2 | 8/2007 | Muchow et al. | |
| 7,284,441 B2 * | 10/2007 | Zdeblick | A61B 5/0215 73/753 |
| 7,762,138 B2 | 7/2010 | Zdeblick et al. | |
| 7,856,885 B1 * | 12/2010 | Bhansali | G01D 11/245 73/721 |
| 10,018,489 B2 | 7/2018 | Moukharski et al. | |

(Continued)

FOREIGN PATENT DOCUMENTS

| | | | |
|---|---|---|---|
| WO | WO90/15976 A1 | 12/1990 | |
| WO | WO-2019107680 A1 * | 6/2019 | ........... H01L 41/047 |

OTHER PUBLICATIONS

Extended European Search Report for EP Application No. 19215739. 4, dated Jun. 19, 2020, 11 pages.

*Primary Examiner* — Nguyen Q. Ha
(74) *Attorney, Agent, or Firm* — Kinney & Lange, P.A.

(57) ABSTRACT

A micromechanical piezoresistive pressure sensor includes a diaphragm configured to mechanically deform in response to an applied load, a sensor substrate located on the diaphragm, and a number of piezoresistive resistance devices located on the sensor substrate. The piezoresistive resistance devices are arranged in a first planar array defining a grid pattern having two or more rows, each row being aligned in a first direction. The piezoresistive resistance devices are configured to be electrically connected in a number of bridge circuits, whereby the piezoresistive resistance devices in each row is electrically connected in an associated bridge circuit. A method of using the micromechanical piezoresistive pressure sensor is also disclosed.

20 Claims, 6 Drawing Sheets

(56) References Cited

U.S. PATENT DOCUMENTS

| | | |
|---|---|---|
| 2007/0089526 A1 | 4/2007 | Kurtz et al. |
| 2007/0289388 A1 | 12/2007 | Kurtz |
| 2010/0083764 A1 | 4/2010 | Kurtz |
| 2010/0139410 A1* | 6/2010 | Jakobsen .............. B01D 65/102 73/721 |
| 2011/0140215 A1* | 6/2011 | Sato ...................... G01L 9/0042 257/419 |
| 2018/0224348 A1* | 8/2018 | Holm .................... G01L 9/0054 |

* cited by examiner

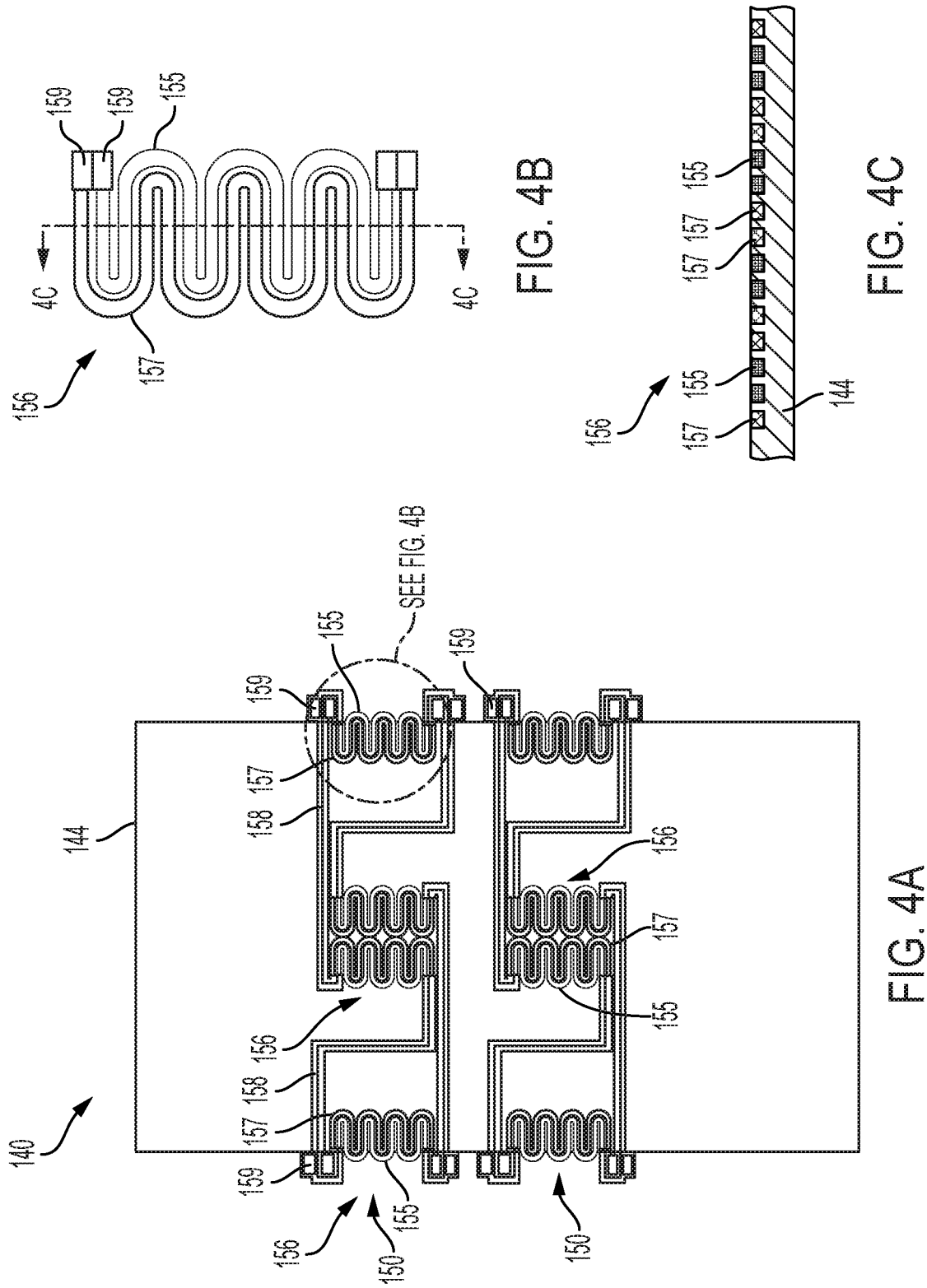

MICROMECHANICAL REDUNDANT PIEZORESISTIVE ARRAY PRESSURE SENSOR

BACKGROUND

The present application relates to pressure sensors, and more particularly, to aircraft pitot and static pressure sensors having micromechanical piezoresistive elements.

Probes and associated pressure sensors are utilized to determine characteristics of an environment. In aircraft systems, for example, air data probes (e.g., pitot and/or pitot-static probes) can be implemented on the external portions of the aircraft to aid in determination of conditions such as true airspeed, calibrated airspeed, Mach number, altitude, angle of attack, angle of sideslip, or other air data parameters. A typical configuration can utilize a pitot tube external to an aircraft, connected by a pneumatic tube to a micromechanical piezoresistive sensor element. The micromechanical piezoresistive sensor elements can be installed on a pressure diaphragm that is influenced by air pressure communicated via the pneumatic tube. In a typical configuration, four micromechanical piezoresistive resistors are connected in a Wheatstone bridge circuit, thereby producing an electrical signal that is indicative of the sensed pressure. It can be beneficial to have redundancy in installed micromechanical piezoresistive sensors, in the event of erroneous response by one or more sensor elements. Redundancy in sensors can be achieved by installing multiple pitot tubes, for example, but this can be costly.

SUMMARY

A micromechanical piezoresistive pressure sensor includes a diaphragm configured to mechanically deform in response to an applied load, a sensor substrate located on the diaphragm, and a number of piezoresistive resistance devices located on the sensor substrate. The piezoresistive resistance devices are arranged in a first planar array defining a grid pattern having two or more rows, each row being aligned in a first direction. The piezoresistive resistance devices are configured to be electrically connected in a number of bridge circuits, whereby the piezoresistive resistance devices in each row is electrically connected in an associated bridge circuit.

A method for measuring a system pressure using a micromechanical redundant piezoresistive array pressure sensor including a diaphragm configured to mechanically deform in response to an applied load, a sensor substrate located on the diaphragm, and a number of piezoresistive resistance devices located on the sensor substrate, where the piezoresistive resistance devices are arranged in a first planar array defining a grid pattern having two or more rows, each of the two or more rows aligned in a first direction, and each of the two or more rows having four piezoresistive resistance devices electrically connected in an associated bridge circuit. The method includes applying a supply voltage to one or more bridge circuits, each configured to produce an electrical output voltage, fluidly communicating the system pressure to the diaphragm, thereby applying load to the diaphragm, measuring the electrical output voltage, and producing a signal representative of the system pressure based on the measured electrical output voltage.

BRIEF DESCRIPTION OF THE DRAWINGS

FIG. 4A is a schematic top view of a second embodiment of a redundant pressure sensor.
FIG. 4B is a top view of one of the double serpentine resistors of the redundant pressure sensor shown in FIG. 3A.
FIG. 4C is a side cross-sectional view of the double serpentine resistor shown in FIG. 4B.

DETAILED DESCRIPTION

Figure 1B:
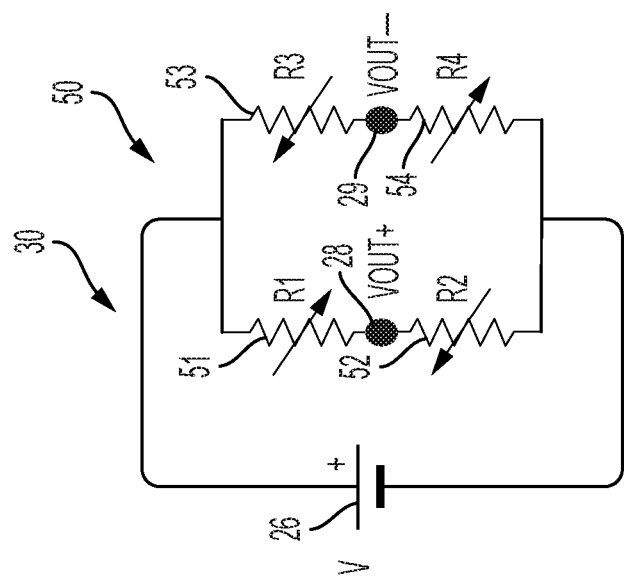
FIG. 1B is an electrical schematic diagram of a bridge circuit for the pressure sensor shown in FIG. 1A.
Figure 1A:
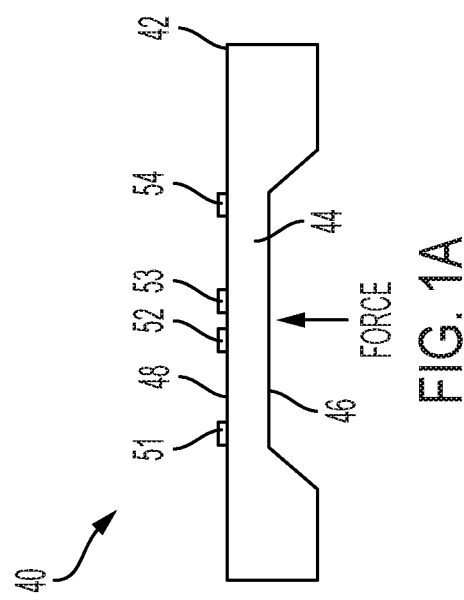
FIG. 1A is a side view of a redundant pressure sensor.

FIG. 1A is a side view of a redundant pressure sensor. FIG. 1B is an electrical schematic diagram of a bridge circuit for the redundant pressure sensor shown in FIG. 1A. Shown in FIGS. 1A-1B are voltage supply 26, positive output terminal 28, negative output terminal 29, Wheatstone bridge circuit 30, redundant pressure sensor 40, sensor body 42, diaphragm 44, pressure surface 46, resistor surface 48, first resistor 51, second resistor 52, third resistor 53, and fourth resistor 54. Pressure cell 42 can be located within an enclosure (not shown) that is arranged to subject diaphragm 44 to a pressure source that is to be sensed. For example, the pressure source can be a pitot tube (not shown) located external to an aircraft (not shown), with the pressure source being communicated to sensor body 42 by a pneumatic tube (not shown). This can be referred to as a dynamic pressure. The dynamic pressure is directed to pressure surface 46, applying a force to diaphragm 44, thereby causing diaphragm 44 to deflect in response to the dynamic pressure. The force can also be referred to as a load. In the illustrated embodiment, the dynamic pressure is an absolute pressure, whereby pressure communicated by a single pneumatic tube acts on only one surface of diaphragm 44. Resistor surface 48 is on the opposite side of diaphragm 44 from pressure surface 46. The deflection of diaphragm 44 induces a mechanical strain in resistor surface 48. First resistor 51, second resistor 52, third resistor 53, and fourth resistor 54 are piezoresistive resistors, the resistance (i.e., electrical resistance) of each of which varies in response to the induced mechanical strain.

During operation of redundant pressure sensor 40, the application of the dynamic pressure to diaphragm 44 causes the resistance of first resistor 51, second resistor 52, third resistor 53, and fourth resistor 54 to each vary in response to the system pressure, thereby causing the force exerted on diaphragm 44 to vary. First resistor 51, second resistor 52, third resistor 53, and fourth resistor 54 (i.e., R1, R2, R3, and R4, respectively) are electrically arranged in Wheatstone bridge circuit 30. Resistor array 50 includes first resistor 51, second resistor 52, third resistor 53, and fourth resistor 54. A voltage V from voltage supply 26 is applied across resistor array 50 in Wheatstone bridge circuit 30, thereby producing an output signal across positive output terminal 28 and negative output terminal 29 that is indicative of the dynamic pressure. As will be shown and described later in FIGS. 2A-2D, multiple resistor arrays 50 can be located on diaphragm 44, thereby supporting multiple Wheatstone bridge circuits 30 that can be formed with redundant pressure sensor 40.

Figure 2D:
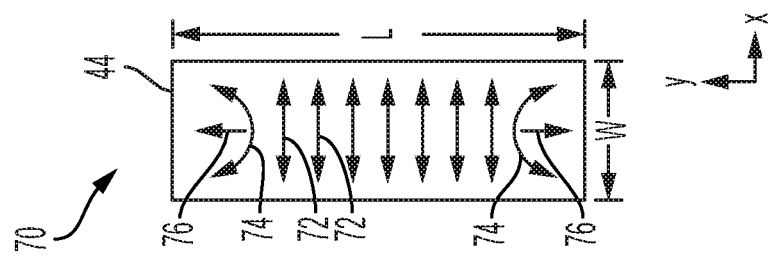
FIG. 2D is a schematic diagram showing stress gradient vectors in the redundant pressure sensor shown in FIG. 2A in response to an applied pressure.
Figure 2C:
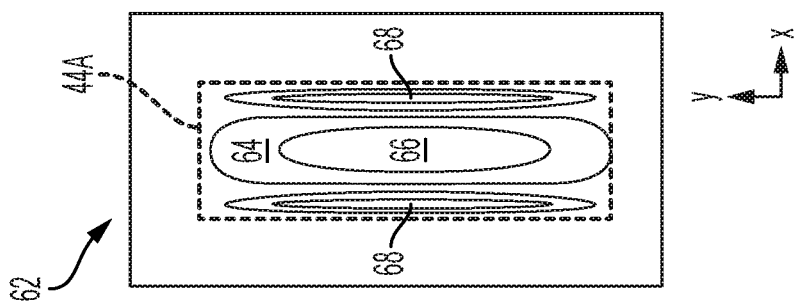
FIG. 2C is a graph showing x-axis stress in the redundant pressure sensor shown in FIG. 2A in response to an applied pressure.
Figure 2B:
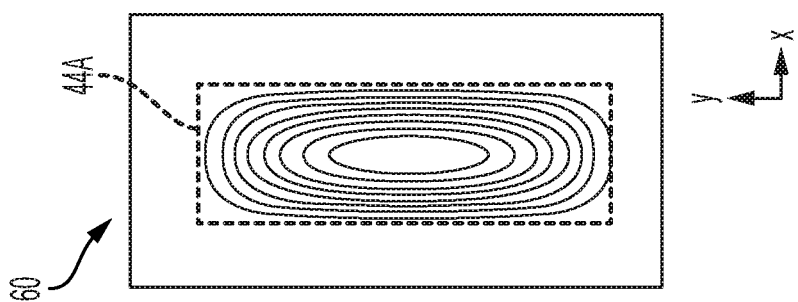
FIG. 2B is a graph showing diaphragm displacement on the redundant pressure sensor shown in FIG. 2A in response to an applied pressure.
Figure 2A:
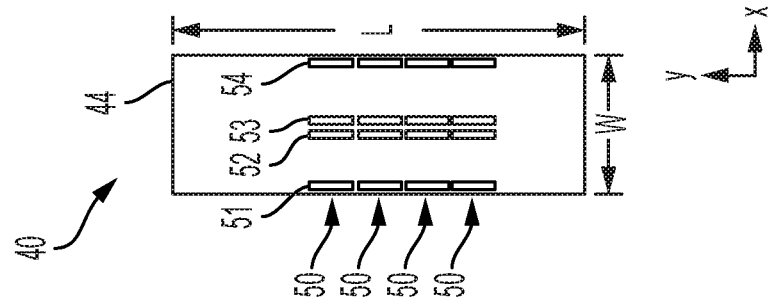
FIG. 2A is a top view of the redundant pressure sensor shown in FIG. 1A.

FIG. 2A is a top view of redundant pressure sensor 40. Shown in FIG. 2A are redundant pressure sensor 40, diaphragm substrate 44, resistor arrays 50, first resistor 51, second resistor 52, third resistor 53, and fourth resistor 54. Also shown in FIG. 2A are length L and width W, and a reference x-y coordinate axis. Length L can be referred to as a first direction, and width W can be referred to as a second direction. Accordingly, the first direction is substantially perpendicular to the second direction. As shown in FIG. 2A, width W is along the x-axis, and length L is along the y-axis. It is to be appreciated that the reference x-y coordinate axis is illustrative for use in describing the present disclosure. Moreover, it is to be appreciated that redundant pressure sensor 40 can be located in an enclosure (not shown), thereby allowing a pressure (e.g., a dynamic pressure from a pitot tube) to be applied to diaphragm 44. In the illustrated embodiment, length L is about 2.5 millimeters (mm) and width W is about 1 mm. A diaphragm aspect ratio can be defined as the ratio of length L to width W. In the illustrated embodiment, the diaphragm aspect ratio is about 2.5. In some embodiments, the diaphragm aspect ratio can range from about 1.5-4. In other embodiments, the diaphragm aspect ratio can range from about 1.2-8. In yet other embodiments, the diaphragm aspect ratio can be greater than about 8. Any value of diaphragm aspect ratio is within the scope of the present disclosure. As noted earlier, in the illustrated embodiment width W is about 1 mm. In some embodiments, width W can range from about 0.5 mm (500 μm)-4 mm. In other embodiments, width W can be less than 500 μm or greater than 4 mm. Any values of length L and width W are within the scope of the present enclosure. It is to be appreciated that exemplary values of width W are presented above, and that corresponding values of length L will exist in a particular embodiment based on a particular diaphragm aspect ratio.

Redundant pressure sensor 40 can be referred to as a redundant array pressure sensor, a multiple bridge circuit pressure sensor, a redundant bridge circuit pressure sensor, or a micromechanical redundant piezoresistive array pressure sensor, because multiple resistor elements (i.e. resistor arrays 50) are located on diaphragm substrate 44, thereby supporting multiple (i.e., redundant) Wheatstone bridge circuits 30. Referring again to FIG. 2A, four resistor arrays 50 are located on diaphragm substrate 44, with each resistor array 50 including first resistor 51, second resistor 52, third resistor 53, and fourth resistor 54, each of which is a piezoresistive resistor (i.e., piezoresistor), in which the resistance varies in response to an induced mechanical strain. Therefore, first resistor 51, second resistor 52, third resistor 53, and fourth resistor 54 can each be referred to as a piezoresistor, because their resistance values each vary in response to an applied stress. First resistor 51, second resistor 52, third resistor 53, and fourth resistor 54 of each resistor array 50 can be arranged in Wheatstone bridge circuit 30, as shown above in FIG. 1B. Accordingly, four Wheatstone bridge circuits 30 can be associated with the four resistor arrays 50 shown in FIG. 2A. As shown in FIG. 2A, width W defines an axis along which first resistor 51, second resistor 52, third resistor 53, and fourth resistor 54 in each resistor array 50 are generally aligned. Accordingly, the resistance values of first resistor 51, second resistor 52, third resistor 53, and fourth resistor 54 will be responsive to a mechanical strain that is induced along the x-axis when a pressure is applied to diaphragm 44 of redundant pressure sensor 40. In the illustrated embodiment, four resistor arrays 50 are located on diaphragm substrate 44. In some embodiments, two or three resistor arrays 50 can be located on diaphragm substrate 44. In other embodiments, more than four resistor arrays 50 can be located on diaphragm substrate 44. It is to be appreciated that the number of resistor arrays 50 that are located on a particular diaphragm substrate 44 can vary with the diaphragm aspect ratio for a particular diaphragm substrate 44, with a larger number of resistor arrays 50 generally being associated with a larger diaphragm aspect ratio. Any number of resistor arrays 50 that is greater than one is within the scope of the present disclosure. In an exemplary embodiment, the static resistance value of each piezoresistor (e.g., first resistor 51, second resistor 52, third resistor 53, fourth resistor 54) can be about 5,000 ohms. In some embodiments, the static resistance value can range from about 1,000-10,000 ohms. In other embodiments, the static resistance value can be less than 1,000 ohms or greater than 10,000 ohms. In some embodiments, all piezoresistors in a particular resistor array 50 can have nearly the same static resistance value as each other. In other embodiments, two or more piezoresistors in a particular resistor array 50 can have different static resistance values.

FIG. 2B is a graph showing diaphragm displacement of diaphragm substrate 44 on redundant pressure sensor 40 shown in FIG. 2A in response to an applied pressure. Shown in FIG. 2B are diaphragm substrate 44A, displacement map 60, and reference x-y coordinate axis. Diaphragm substrate 44A shows the outline of diaphragm substrate 44 in relation to displacement map 60. The various traces in displacement map 60 correspond to iso-displacement values in response to a particular applied pressure, with higher values being located toward the center.

FIG. 2C is a graph showing x-axis stress across diaphragm substrate 44 on redundant pressure sensor 40 shown in FIG. 2A in response to an applied pressure. Shown in FIG. 2C are diaphragm substrate 44A, stress map 62, end stress region 64, uniform stress region 66, and side stress regions 68. Also shown is FIG. 2C is reference x-y coordinate axis. Diaphragm substrate 44A shows the outline of diaphragm substrate 44 in relation to stress map 62. The various traces in stress map 62 correspond to iso-x-axis stress values in response to a particular applied pressure. Uniform stress region 66 is surrounded by end stress region 64 and side stress regions 68 when a particular pressure (i.e., the resulting force from the applied pressure) is applied to diaphragm substrate 44. As shown in FIG. 2C, uniform stress region 66 covers the region where resistor arrays 50 (shown in FIG. 2A) are located.

FIG. 2D is a schematic diagram showing stress gradient vectors across diaphragm substrate 44 on redundant pressure sensor 40 shown in FIG. 2A in response to an applied pressure. Shown in FIG. 2D are diaphragm substrate 44, stress gradient vector map 70, uniform x-axis stress gradient vectors 72, distorted stress gradient vectors 74, and end y-axis stress gradient vectors 76. Uniform x-axis stress gradient vectors 72, distorted stress gradient vectors 74, and end y-axis stress gradient vectors 76 depict the x-axis component of stress across diaphragm substrate 44, resulting from a particular applied pressure. Uniform x-axis stress gradient vectors 72 result from uniform stress region 66 shown in FIG. 2C. Uniform x-axis stress gradient vectors 72 result in regions of diaphragm substrate 44A where resistor arrays 50 are located. Accordingly, multiple resistor arrays 50 will be subjected to a uniform x-axis stress gradient, as shown by uniform x-axis stress gradient vectors 72, when a particular pressure is applied to redundant pressure sensor 40. Distorted stress gradient vectors 74 and end y-axis stress gradient vectors 76 result at or near the ends (i.e., opposite end regions of diaphragm substrate 44, 44A with respect to length L). In the illustrated embodiment, a single redundant pressure sensor 40 includes four resistor arrays 50, each of which experiences a uniform response to an applied pressure, and each of which can be included in a Wheatstone bridge circuit. Accordingly, four electrical output signals can be produced by the respective Wheatstone bridge circuits associated with each of the four resistor arrays 50, thereby providing multiply-redundant signals from redundant pressure sensor 40. It is to be appreciated that the output signal from each Wheatstone bridge circuit is an analog voltage potential that is representative of the strain induced in diaphragm substrate 44, and accordingly, of the pressure that is applied to redundant pressure sensor 40. In an exemplary embodiment, an analog-to-digital converter (ADC) can be used to produce a digital signal that is representative of the analog voltage potential. A digital signal can be provided to a digital computer for processing.

Figure 3C:
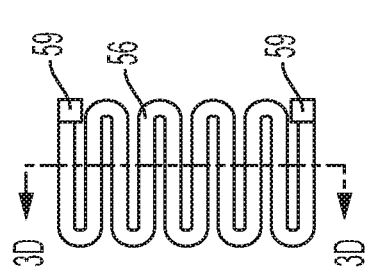
FIG. 3C is a top view of one of the serpentine resistors of the redundant pressure sensor shown in FIG. 3A.
Figure 3D:
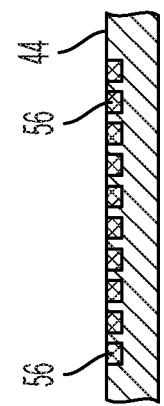
FIG. 3D is a side cross-sectional view of the serpentine resistor shown in FIG. 3C.
Figure 3B:
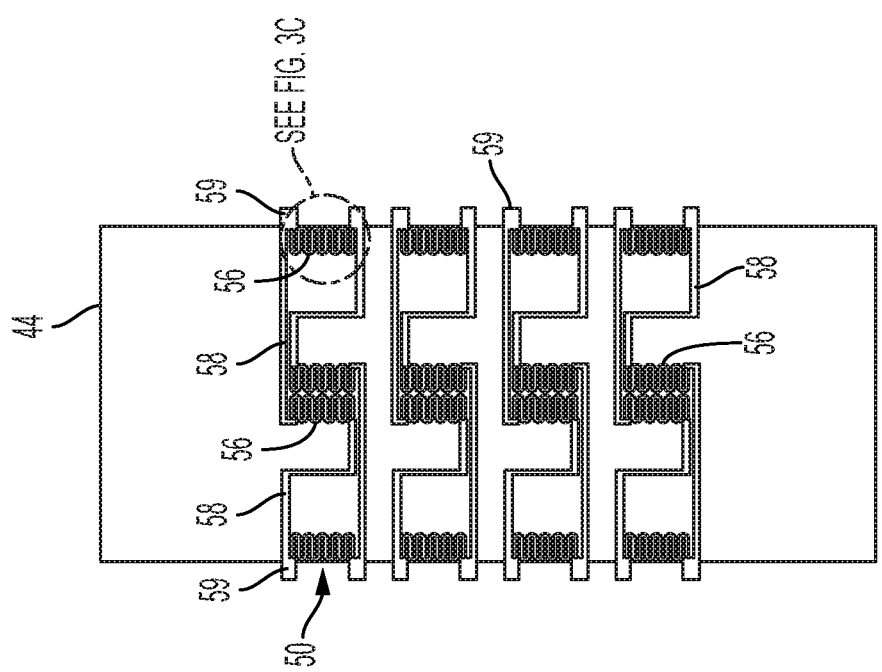
FIG. 3B a schematic top view of the redundant pressure sensor shown in FIG. 3A.
Figure 3A:
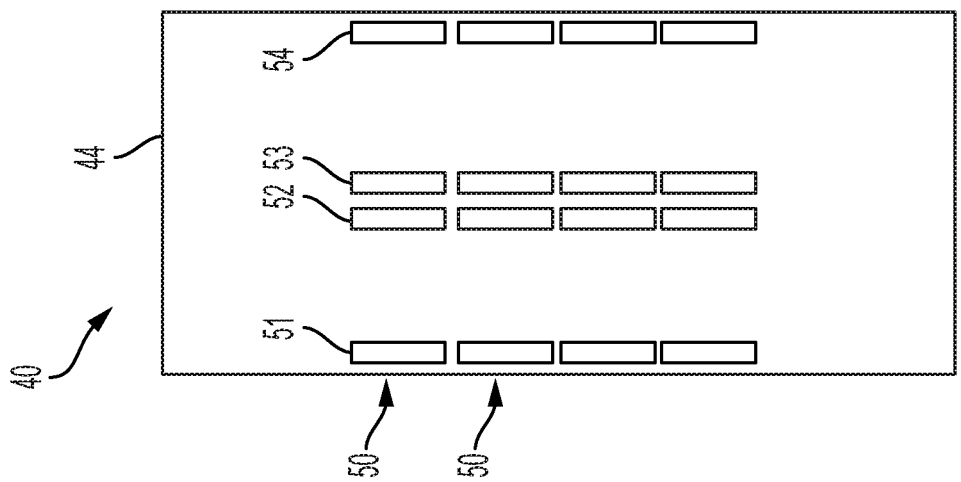
FIG. 3A is the top view of the redundant pressure sensor shown in FIG. 2A.

FIG. 3A is the top view of redundant pressure sensor 40 shown in FIG. 2A. FIG. 3B is a schematic top view of redundant pressure sensor 40 shown in FIG. 3A. FIG. 3C is a top view of one of the serpentine resistors of redundant pressure sensor 40 shown in FIG. 3A. FIG. 3D is a side cross-sectional view of the serpentine resistor shown in FIG. 3C. Shown in FIGS. 3A-3D are redundant pressure sensor 40, diaphragm substrate 44, resistor arrays 50, first resistors 51, second resistors 52, third resistors 53, fourth resistors 54, serpentine resistors 56, conductive traces 58, and edge pads 59. The description of redundant pressure sensor 40, diaphragm substrate 44, resistor arrays 50, first resistors 51, second resistors 52, third resistors 53, and fourth resistors 54, is as provided above in regard to FIG. 2A. Resistor arrays 50, first resistors 51, second resistors 52, third resistors 53, and fourth resistors 54 can be referred to as a planar array (i.e., arranged on a plane) in a grid pattern. Each resistor array 50 can be referred to as a row. First resistors 51, second resistors 52, third resistors 53, and fourth resistors 54 each have a serpentine pattern, as shown in FIGS. 3B-3C, thereby defining serpentine resistor 56. Serpentine resistors 56 are made of piezoresistive material, embedded in diaphragm substrate 44, each interconnected by conductive traces 58, which terminate as edge pads 59 along the outer edges of diaphragm substrate 44. Accordingly, serpentine resistors 56 and conductive traces 58 help form a Wheatstone bridge circuit for each resistor array 50, with edge pads 59 being used to provide external connections to complete each Wheatstone bridge circuit. It is to be appreciated that a voltage supply (not shown) is generally needed to obtain an electrical signal from each resistor array 50.

An advantage to using a serpentine pattern for serpentine resistor 56 is the compactness of the piezoresistive material in a relatively small surface area, thereby resulting in a much greater change in resistance in response to an induced stress as opposed to a non-serpentine pattern. Accordingly, a serpentine pattern can provide a relatively high sensitivity when relatively small pressures are measured. A differential pressure, applied across opposite surfaces of diaphragm substrate 44, is a non-limiting example of a relatively small pressure. Redundant pressure sensor 40 can be used in various embodiments to measure a wide range of pressure values, ranging from 0-1,000 psi (0-6,895 KPa). As a non-limiting example, redundant pressure sensor 40 can be used to sense pressure in a compression stage of a gas turbine engine. Accordingly, in various embodiments, serpentine resistors 56 can have configurations different from those shown in FIGS. 3B-3C. For example, either fewer or more turn-backs can be used than shown, or other geometric shapes can be used than shown. In some embodiments, serpentine resistors 56 (i.e., first resistor 51, second resistor 52, third resistor 53, and fourth resistor 54) can have non-serpentine patterns, with non-limiting examples including straight sections, and straight or serpentine sections in which switch-back regions and/or corners can have fillets, chamfered regions, or have sharper corners than shown in FIG. 3A. A conformal coat (not shown) can be applied over the surface of resistor arrays 50 to provide a protective dielectric surface.

FIG. 4A is a schematic top view of a second embodiment of a redundant pressure sensor. FIG. 4B is a top view of one of the double serpentine resistors of the redundant pressure sensor shown in FIG. 4A. FIG. 4C is a side cross-sectional view of the double serpentine resistor shown in FIG. 4B. Shown in FIGS. 4A-4C are redundant pressure sensor 140, diaphragm substrate 144, resistor arrays 150, first serpentine resistors 155, double serpentine resistors 156, second serpentine resistors 157, conductive traces 158, and edge pads 159. Redundant pressure sensor 140 includes sixteen individual resistor elements, each having a serpentine pattern, described as follows. Diaphragm substrate 144 is substantially as described above in regard to FIG. 2A. Conductive traces 158 and edge pads 159 are substantially as described above in regard to FIGS. 3A-3D. Each resistor array 150 includes four double serpentine resistors 156, each double serpentine resistor 156 having a first serpentine resistor 155 and a second serpentine resistor 157 mechanically intertwined with each other, but electrically separate from each other. Accordingly, each double serpentine resistor 156 and associated conductive traces 158 and edge pads 159 provides the electrical circuitry for two separate Wheatstone bridge circuits. Redundant pressure sensor 140 includes resistor elements for four Wheatstone bridge circuits, as did redundant pressure sensor 40 shown in FIGS. 3A-3D, but along a length that is more compact. Accordingly, the diaphragm aspect ratio of diaphragm substrate 144 can be less than that of diaphragm substrate 44 shown above in FIGS. 3A-3B. Alternatively, in other embodiments, a greater number of resistor arrays 150 can be included on diaphragm substrate 144 having a larger diaphragm aspect ratio than shown in FIG. 4A. Therefore, in these other embodiments, diaphragm substrate 144 can support a higher redundancy than that shown in FIG. 4A (i.e., more than four sets of resistor elements) for a particular diaphragm aspect ratio.

Figure 5B:
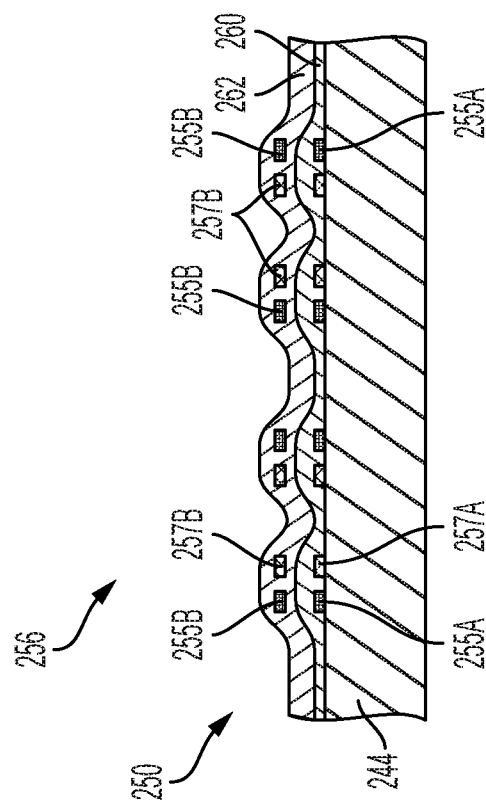
FIG. 5B is a side cross-sectional view of the double serpentine resistor shown in FIG. 5A.
Figure 5A:
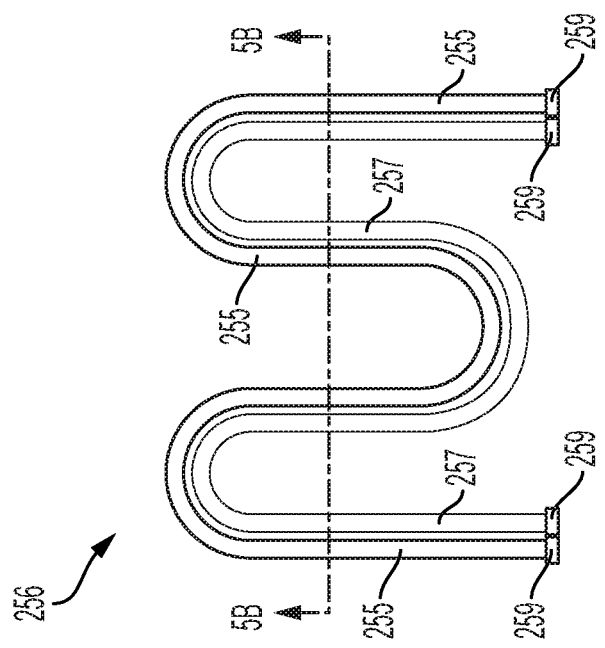
FIG. 5A is a schematic top view of a second embodiment of a double serpentine resistor for use in the redundant pressure sensor.

FIG. 5A is a schematic top view of a second embodiment of a double serpentine resistor for use in the redundant pressure sensor. FIG. 5B is a side cross-sectional view of the double serpentine resistor shown in FIG. 5A. Shown in FIGS. 5A-5B are diaphragm substrate 244, resistor array 250, first serpentine resistors 255255A, 255B, double serpentine resistor 256, second serpentine resistors 257, 257A, 257B, edge pads 259, first conformal coat 260, and second conformal coat 262. Double serpentine resistor 256 shown in FIG. 5A includes first serpentine resistors 255A and 255B in a first later, and second serpentine resistors 257A and 257B in a second layer, as will be described. Accordingly, double serpentine resistor 256 is also resistor array 250, which includes a first, second, third, and fourth resistor (not labeled in FIGS. 5A-5B). First and second serpentine resistors 255A, 257A are similar to double serpentine resistor 156 shown above in FIGS. 4A-4B, and are located on or in the surface of diaphragm substrate 244 (not shown in FIG. 5A). Double serpentine resistor 256 (i.e., resistor array 250) can be used to form a Wheatstone bridge circuit, with a first layer (i.e., first and second serpentine resistors 255A, 257A) and a second layer (i.e., first and second serpentine resistors 255B, 257B) being stacked vertically in a direction outward from the surface of diaphragm substrate 244. Accordingly, the first layer is nearest the surface of diaphragm substrate 244, and the second layer is furthest from the surface of diaphragm substrate 244. First conformal coat 260 is a dielectric material that electrically insulates various layers of double serpentine resistors 256. It is to be appreciated that resistor array 250, containing a first, second, third, and fourth resistor for a Wheatstone bridge circuit can be located on a relatively small area of diaphragm substrate 244. In a typical embodiment, multiple resistor arrays 250 can be placed on diaphragm substrate 244, thereby providing various embodiments of a redundant pressure sensor.

Several exemplary embodiments of redundant pressure sensor 40, 140, 240 are shown in FIGS. 3A-3D, 4A-4C, and 5A-5B. Repetitions of various described features can be extended to provide further redundancy. Double serpentine resistor 156 shown in FIGS. 4A-4C can include a third, fourth, or more additional mechanically-intertwined serpentine resistor(s). As a non-limiting example, four mechanically-intertwined serpentine resistors that are electrically-insulated from each other can be used to make a quadruple serpentine resistor. Single serpentine resistors 56 shown in FIGS. 3A-3D can be vertically stacked on diaphragm substrate 44 in two, three, four, or more layers, with a conformal coat (not shown) insulating various layers. Triple serpentine resistors, quadruple serpentine resistors, or more can be vertically stacked on diaphragm substrate 44, 144, 244, thereby providing a nearly limitless combination of mechanically-intertwined serpentine resistors and number of layers. Moreover, any of the afore-mentioned combinations can be extended along the length of a diaphragm substrate (i.e., in the y-axis direction as shown in FIG. 2A), thereby providing any number of redundant resistor arrays in a particular redundant pressure sensor.

The number of Wheatstone bridge circuits that can be supported by a redundant pressure sensor 40, 140, 240 can range from two to 50 or more, depending on the particular embodiment as described above. In some of these embodiments, a separate Wheatstone bridge circuit can be used for each array of four piezoresistors. In other embodiments, there can be a fewer number of Wheatstone bridge circuits. For example, a larger number of resistor arrays 50, 150, 250 can be manufactured on a particular diaphragm substrate 44, 144, 244, while not electrically connecting all of the resistor arrays 50, 150. In an exemplary embodiment, resistor arrays 50, 150 that exhibit the best performance (e.g., sensitivity, linearity) can be selected for use.

Redundant pressure sensor 40, 140, 240 can be beneficial in reducing measurement error. For example, total sensor error E can be calculated by equation 1 as follows, where E is the error of each Wheatstone bridge circuit, and n is the total number of Wheatstone bridge circuits:

$$E = \varepsilon/\sqrt{n} \qquad \text{(Equation 1)}$$

In an exemplary embodiment, each individual Wheatstone bridge circuit that uses each resistor array 50, 150 can have an error E of about 0.1% of full scale. Accordingly, in this exemplary embodiment, redundant pressure sensor 40, 140 having four resistor arrays 50, 150 can have a total sensor error E of about 0.05% of full scale. In other embodiments, for example, where a greater number of resistor arrays are used, a redundant pressure sensor of the present disclosure can achieve a total sensor error E of about 0.02%. In yet other embodiments, a redundant pressure sensor can achieve a total sensor error E of less than 0.02%. As used in the present disclosure, total sensor error E can also be referred to as sensor accuracy.

Figure 6:
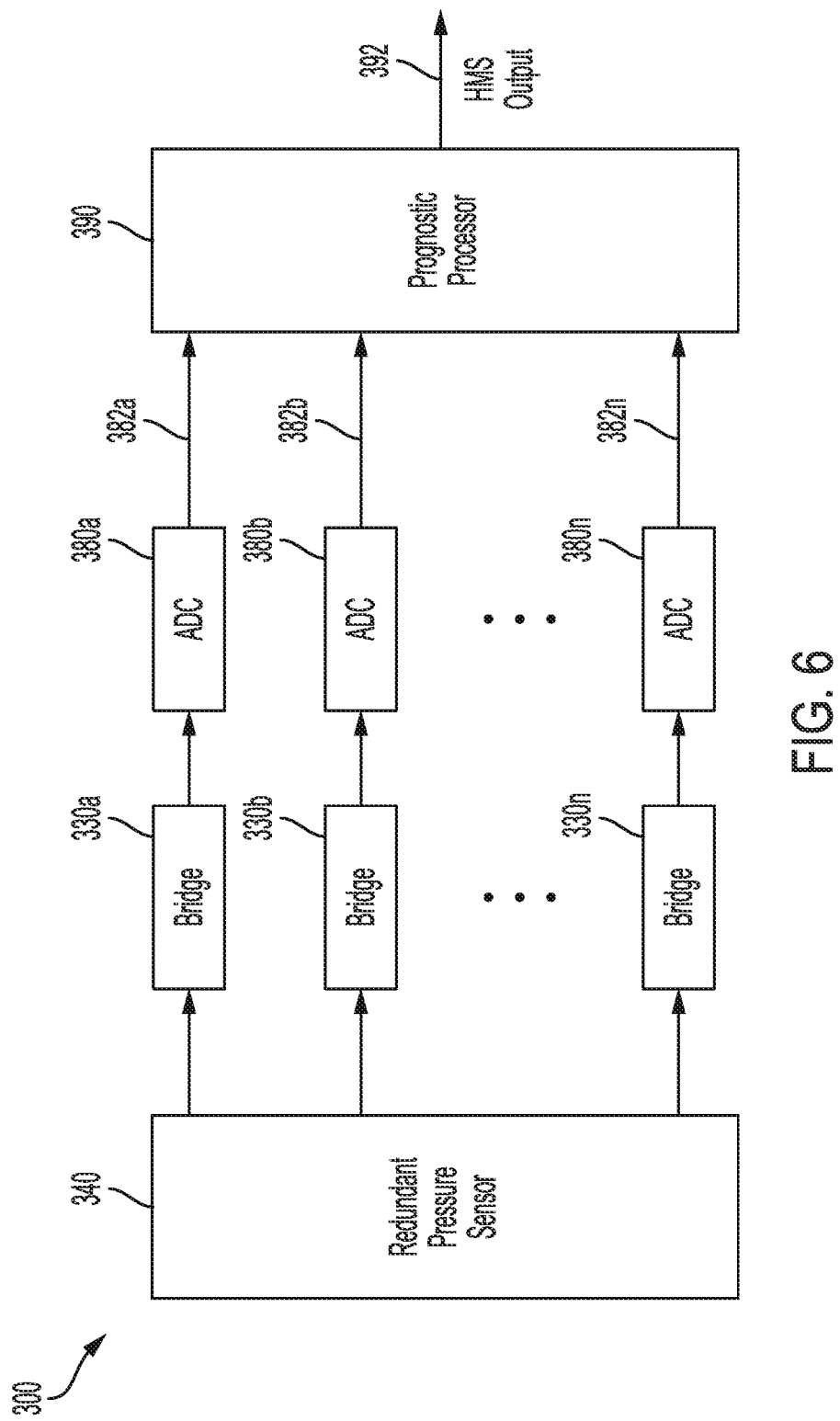
FIG. 6 is a health monitoring system using a third embodiment of a redundant pressure sensor.

FIG. 6 is a health monitoring system using a third embodiment of a redundant pressure sensor. Shown in FIG. 6 are health monitoring system 300, redundant pressure sensor 340, Wheatstone bridge circuits 330a, 330b, ... 330n, analog-to-digital converter (ADC) 380a, 380b, ... 380n, digital pressure signals 382a, 382b, ... 382n, prognostic processor 390, and health monitoring system output 392. Redundant pressure sensor 340 includes a number n of resistor arrays (not shown in FIG. 6), with each resistor array including a first, second, third, and fourth resistor. Each resistor array is used in an associated Wheatstone bridge circuit 330a, 330b, ... 330n, which provide a signal to an associated analog-to-digital converter (ADC) 380a, 380b, ... 380n. In a particular embodiment, redundant pressure sensor 340 can have four resistor arrays (e.g., as shown above in regard to FIGS. 3A-3B). In some embodiments, redundant pressure sensor 340 can have more than four resistor arrays, with an associate number of Wheatstone bridge circuits 330n and analog-to-digital converters (ADC) 380n. Each analog-to-digital converter (ADC) 380a, 380b, ... 380n provides an associated digital pressure signal 382a, 382b, ... 382n to prognostic processor 390. Prognostic processor 390 is a digital processor that receives, stores, and processes digital pressure signals 382a, 382b, ... 382n to produce health monitoring system output 392. In the illustrated embodiment, prognostic processor 390 can include one or more processors (not shown in FIG. 6) that are configured to implement functionality and/or process instructions for execution within prognostic processor 390. The one or more prognostic processor(s) can be capable of processing instructions stored in one or more storage device(s) (not shown in FIG. 6). Examples of processor(s) can include any one or more of a microprocessor, a controller, a digital signal processor (DSP), an application specific integrated circuit (ASIC), a field-programmable gate array (FPGA), or other equivalent discrete or integrated logic circuitry. In some embodiments, prognostic processor 390 can utilize data and signal analysis processing techniques on digital pressure signal 382a, 382b, ... 382n. In these or other embodiments, prognostic processor 390 can be a neural network. In some embodiments, health monitoring system output 392 can be provided to other systems (e.g., avionics system) for use by crew members. In these or other embodiments, health monitoring system output 392 and/or be downloaded and provided to engineering teams at the airline's operator and/or the various component suppliers for review, analysis, and/or archival.

Referring again to FIG. 6, health monitoring system 300 can provide a highly accurate pressure indication by performing an arithmetic average of multiple digital pressure signals 382a, 382b, . . . 382n. Health monitoring system 300 can also evaluate and correlate multiple digital pressure signals 382a, 382b, . . . 382n to determine if one or more are discrepant relative to others. Accordingly, health monitoring system 300 can ignore one or more individual digital pressure signals 382n after identifying it as being discrepant. In some embodiments, health monitoring system 300 can track the performance of redundant pressure sensor 340 over time, and can identify via health monitoring system output 392 when failure is expected to occur so that maintenance can be scheduled prior to a point of expected failure.

Discussion of Possible Embodiments

The following are non-exclusive descriptions of possible embodiments of the present invention.

A micromechanical redundant piezoresistive array pressure sensor, comprising: a diaphragm, configured to mechanically deform in response to a load applied thereto; a sensor substrate disposed on the diaphragm; and a plurality of piezoresistive resistance devices disposed on the sensor substrate; wherein: the plurality of piezoresistive resistance devices are arranged in a first planar array defining a grid pattern comprised of two or more rows, each of the two or more rows aligned in a first direction; and the plurality of piezoresistive resistance devices are configured to be electrically connected in a plurality of bridge circuits, the plurality of piezoresistive resistance devices in each of the two or more rows being electrically connected in an associated bridge circuit.

The micromechanical redundant piezoresistive array pressure sensor of the preceding paragraph can optionally include, additionally and/or alternatively, any one or more of the following features, configurations and/or additional components:

A further embodiment of the foregoing micromechanical redundant piezoresistive array pressure sensor, wherein each of the plurality of piezoresistive resistance devices has a serpentine pattern.

A further embodiment of the foregoing micromechanical redundant piezoresistive array pressure sensor, wherein the grid pattern is comprised of four rows.

A further embodiment of the foregoing micromechanical redundant piezoresistive array pressure sensor, further comprising: a first dielectric layer, disposed on the first planar array; and a second planar array, disposed on the dielectric layer; wherein: the first planar array comprises at least two rows; and the second planar array comprises at least two rows.

A further embodiment of the foregoing micromechanical redundant piezoresistive array pressure sensor, wherein two or more of the piezoresistive resistance devices are mechanically intertwined to form an intertwined serpentine array, each of the two or more of the piezoresistive resistance devices being electrically isolated from each other.

A further embodiment of the foregoing micromechanical redundant piezoresistive array pressure sensor, further comprising a second dielectric layer, disposed on the second planar array.

A further embodiment of the foregoing micromechanical redundant piezoresistive array pressure sensor, further comprising a pressure cell, wherein the pressure cell is configured to: receive a system pressure; and produce the applied load, the applied load being indicative of the system pressure.

A further embodiment of the foregoing micromechanical redundant piezoresistive array pressure sensor, wherein the system pressure is a differential pressure.

A further embodiment of the foregoing micromechanical redundant piezoresistive array pressure sensor, wherein the system pressure ranges from 0-1,000 psi (0-6,895 KPa).

A further embodiment of the foregoing micromechanical redundant piezoresistive array pressure sensor, wherein: the sensor substrate is configured to produce a stress profile that is representative of the applied load; the stress profile defines an x-axis stress component in an x-axis direction defined by a second direction, the second direction being substantially perpendicular to the first direction; and the x-axis stress component is substantially uniform in each of the plurality of rows.

A further embodiment of the foregoing micromechanical redundant piezoresistive array pressure sensor, wherein: each of the plurality of piezoresistive resistance devices defines a static resistance; and the static resistance ranges from 1,000-10,000 ohms.

A further embodiment of the foregoing micromechanical redundant piezoresistive array pressure sensor, wherein: the diaphragm comprises a substantially rectangular diaphragm region defining a length and a width; a ratio of the length to the width defines a diaphragm aspect ratio; and the diaphragm aspect ratio is at least 1.2.

A further embodiment of the foregoing micromechanical redundant piezoresistive array pressure sensor, wherein the diaphragm aspect ratio ranges from 1.5-8.

A further embodiment of the foregoing micromechanical redundant piezoresistive array pressure sensor, wherein a health monitoring system comprises: a prognostic processor; and foregoing micromechanical redundant piezoresistive array pressure sensor; wherein: the prognostic processor is configured to identify an erroneous indication from one or more of the plurality of bridge circuits.

A method for measuring a system pressure using a micromechanical redundant piezoresistive array pressure sensor comprising a diaphragm configured to mechanically deform in response to a load applied thereto, a sensor substrate disposed on the diaphragm, and a plurality of piezoresistive resistance devices disposed on the sensor substrate, the plurality of piezoresistive resistance devices arranged in a first planar array defining a grid pattern comprised of two or more rows, each of the two or more rows aligned in a first direction, and each of the two or more rows comprising four piezoresistive resistance devices electrically connected in an associated bridge circuit, the method comprising: applying a supply voltage to one or more bridge circuits, the one or more bridge circuits configured to produce an electrical output voltage; fluidly communicating the system pressure to the diaphragm, thereby applying the load to the diaphragm; measuring the electrical output voltage; and producing a signal representative of the system pressure based on the measured electrical output voltage.

The method of the preceding paragraph can optionally include, additionally and/or alternatively, any one or more of the following features, configurations and/or additional components:

A further embodiment of the foregoing method, wherein: the sensor substrate is configured to produce a stress profile that is representative of the applied load; the stress profile defines an x-axis stress component in an x-axis direction defined by a second direction, the second direction being substantially perpendicular to the first direction; and the x-axis stress component is substantially uniform in each of the plurality of rows.

A further embodiment of the foregoing method, wherein the micromechanical redundant piezoresistive array pressure sensor further comprises: a first dielectric layer, disposed on the first planar array; and a second planar array, disposed on the dielectric layer; wherein: the first planar array comprises at least two rows; and the second planar array comprises at least two rows.

A further embodiment of the foregoing method, wherein: the diaphragm comprises a substantially rectangular diaphragm region defining a length and a width; a ratio of the length to the width defines a diaphragm aspect ratio; and the diaphragm aspect ratio is at least 1.2.

A further embodiment of the foregoing method, wherein each of the plurality of piezoresistive resistance devices has a serpentine pattern.

A further embodiment of the foregoing method, wherein two or more piezoresistive resistance devices are mechanically intertwined to form an intertwined serpentine array, each of the two or more piezoresistive resistance devices being electrically isolated from each other.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A micromechanical redundant piezoresistive array pressure sensor, comprising:
   a substantially rectangular diaphragm, configured to mechanically deform in response to a differential pressure applied thereacross, the substantially rectangular diaphragm defining a width and a length in x-axis and y-axis directions, respectively; and
   a plurality of piezoresistive elements disposed on the diaphragm,
      the plurality of piezoresistive elements arranged in a first planar array of rows and columns parallel to the x-axis and y-axis directions, respectively, each row including four piezoresistive elements electrically connected in a bridge circuit configuration thereby forming a plurality of bridge circuits, each of the four piezoresistive elements of each row aligned in columnar fashion with corresponding ones of the four piezoresistive elements of other rows.

2. The micromechanical redundant piezoresistive array pressure sensor of claim 1, wherein the first planar array is comprised of four rows.

3. The micromechanical redundant piezoresistive array pressure sensor of claim 1, wherein each of the plurality of piezoresistive elements has a serpentine pattern.

4. The micromechanical redundant piezoresistive array pressure sensor of claim 3, wherein two or more of the piezoresistive elements are mechanically intertwined to form an intertwined serpentine array, each of the two or more of the piezoresistive elements being electrically isolated from each other.

5. The micromechanical redundant piezoresistive array pressure sensor of claim 1, wherein the plurality of piezoresistive elements arranged in the first planar array is a first plurality of piezoresistive elements, the micromechanical redundant piezoresistive array pressure sensor further comprising:
   a first dielectric layer, disposed on the first planar array; and
   a second plurality of piezoresistive elements arranged in a second planar array substantially identical to the first planar array, the second planar array disposed on the dielectric layer;
   wherein:
      the first planar array comprises at least two rows; and
      the second planar array comprises at least two rows.

6. The micromechanical redundant piezoresistive array pressure sensor of claim 5, further comprising a second dielectric layer, disposed on the second planar array.

7. The micromechanical redundant piezoresistive array pressure sensor of claim 1, wherein the micromechanical redundant piezoresistive array pressure sensor is configured to:
   fluidly communicate a system pressure to the substantially rectangular diaphragm.

8. The micromechanical redundant piezoresistive array pressure sensor of claim 7, wherein the system pressure is a differential pressure.

9. The micromechanical redundant piezoresistive array pressure sensor of claim 7, wherein the system pressure ranges from 0-1,000 psi (0-6,895 KPa).

10. The micromechanical redundant piezoresistive array pressure sensor of claim 1, wherein:
    the differential pressure applied across the diaphragm produces a stress profile that is representative of the differential pressure applied;
    the stress profile defines an x-axis stress component in the x-axis direction and a y-axis stress component in the y-axis direction; and
    the stress component is substantially uniform within each of the columns.

11. The micromechanical redundant piezoresistive array pressure sensor of claim 1, wherein:
    each of the plurality of piezoresistive elements defines a static resistance; and
    the static resistance ranges from 1,000-10,000 ohms.

12. The micromechanical redundant piezoresistive array pressure sensor of claim 1, wherein:
    a ratio of the length to the width of the substantially rectangular diaphragm defines a diaphragm aspect ratio; and
    the diaphragm aspect ratio is at least 1.2.

13. The micromechanical redundant piezoresistive array pressure sensor of claim 12, wherein the diaphragm aspect ratio ranges from 1.5-8.

14. A health monitoring system, comprising:
    a prognostic processor; and
    the micromechanical redundant piezoresistive array pressure sensor of claim 1;
    wherein:
       the prognostic processor is configured to identify an erroneous indication from one or more of redundant measurements of differential pressure provided by the plurality of bridge circuits.

15. A method for measuring a system pressure using a micromechanical redundant piezoresistive array pressure sensor comprising a diaphragm configured to mechanically deform in response to a load applied thereto, and a plurality of piezoresistive resistance devices disposed on the diaphragm, the plurality of piezoresistive resistance devices arranged in a first planar array defining a grid pattern comprised of two or more rows, each of the two or more rows aligned in a first direction, and each of the two or more rows comprising four piezoresistive resistance devices electrically connected in an associated bridge circuit, the method comprising:

applying a supply voltage to one or more bridge circuits, the one or more bridge circuits configured to produce an electrical output voltage;

fluidly communicating the system pressure to the diaphragm, thereby applying the load to the diaphragm;

measuring the electrical output voltage; and producing a signal representative of the system pressure based on the measured electrical output voltage.

16. The method of claim 15, wherein:

the differential pressure applied across the diaphragm produces a stress profile that is representative of the differential pressure applied;

the stress profile defines an x-axis stress component in the x-axis direction and a y-axis stress component in the y-axis direction; and the stress component is substantially uniform within each of the columns.

17. The method of claim 15, wherein the micromechanical redundant piezoresistive array pressure sensor further comprises:

a first dielectric layer, disposed on the first planar array; and a second planar array disposed on the dielectric layer; wherein:

the first planar array comprises at least two rows; and
the second planar array comprises at least two rows.

18. The method of claim 15, wherein:

the diaphragm comprises a substantially rectangular diaphragm region defining a length and a width;

a ratio of the length to the width defines a diaphragm aspect ratio; and the diaphragm aspect ratio is at least 1.2.

19. The method of claim 15, wherein each of the plurality of piezoresistive resistance devices has a serpentine pattern.

20. The method of claim 19, wherein two or more piezoresistive resistance devices are mechanically intertwined to form an intertwined serpentine array, each of the two or more piezoresistive resistance devices being electrically isolated from each other.

* * * * *